(12) United States Patent
Fox

(10) Patent No.: US 11,523,565 B2
(45) Date of Patent: Dec. 13, 2022

(54) FRUSTOCONICAL PLANTER WITH VERTICAL SECUREMENT MEANS

(71) Applicant: Dencell Sinclair Fox, Boulder, CO (US)

(72) Inventor: Dencell Sinclair Fox, Boulder, CO (US)

(*) Notice: Subject to any disclaimer, the term of this patent is extended or adjusted under 35 U.S.C. 154(b) by 594 days.

(21) Appl. No.: 16/562,031

(22) Filed: Sep. 5, 2019

(65) Prior Publication Data
US 2021/0068353 A1    Mar. 11, 2021

(51) Int. Cl.
*A01G 9/12* (2006.01)
*A01G 9/02* (2018.01)
*A47G 7/04* (2006.01)
*A47G 7/02* (2006.01)

(52) U.S. Cl.
CPC ............... *A01G 9/128* (2013.01); *A01G 9/02* (2013.01); *A47G 7/02* (2013.01); *A47G 7/044* (2013.01)

(58) Field of Classification Search
CPC .......... A47G 7/02; A47G 7/044; A01G 9/128; A01G 9/02
See application file for complete search history.

(56) References Cited

U.S. PATENT DOCUMENTS

| | | | | |
|---|---|---|---|---|
| 1,536,679 A * | 5/1925 | Markowski | .............. | A01G 9/12 47/47 |
| 2,250,361 A * | 7/1941 | Cullinan | ................ | A47G 7/025 248/346.07 |
| 4,096,662 A * | 6/1978 | Anderson | .............. | A01G 9/124 248/318 |
| 5,292,014 A * | 3/1994 | Lelong | ................... | A47H 27/00 248/218.4 |
| 5,473,838 A * | 12/1995 | Denbigh | ............. | A01G 27/005 248/104 |
| 8,317,143 B1 * | 11/2012 | Abreu | .................... | A47G 7/044 248/230.9 |
| 9,314,117 B2 * | 4/2016 | Keil | ......................... | A47G 7/08 |
| D775,425 S * | 12/2016 | Petruccelli | ............. | A01G 9/022 D28/38 |
| 2004/0006913 A1 * | 1/2004 | Jordan | .................... | A01G 9/022 47/86 |
| 2011/0084087 A1 * | 4/2011 | Scribner | ................ | A01G 9/022 220/751 |
| 2011/0303809 A1 * | 12/2011 | Tincher | .............. | A47G 23/0225 248/214 |
| 2017/0130893 A1 * | 5/2017 | Wichman | ................ | A47G 7/044 |
| 2021/0100180 A1 * | 4/2021 | Van Buuren | ........... | A01G 31/06 |

* cited by examiner

*Primary Examiner* — Christopher R Harmon
(74) *Attorney, Agent, or Firm* — Steven Rinehart

(57) ABSTRACT

A planter for detachably affixing and securing a pot and plant in a vertical orientation relative to a tree, the planter adapted to allow the tree to grow through the planter and blend in with surrounding vegetation.

12 Claims, 7 Drawing Sheets

FRUSTOCONICAL PLANTER WITH VERTICAL SECUREMENT MEANS

FIELD OF THE INVENTION

This invention relates to gardening, and more particularly relates to pots and planters for receiving and nurturing plants.

BACKGROUND

Description of the Related Art

The present invention constitutes an addition and improvement to standard pots and planters known and commonly available in the art. The application discloses a planter meant to position and grow into an adjacent tree or large shrub.

Traditionally, pots and planters allow person to enjoy gardens in microcosm. In the past, those without sufficient land to plant a garden relied on pots and planters to provide beauty and homegrown vegetables, particularly in residential or apartment environments where economical use of land for gardening was difficult. Pots and planters provided the benefit of planting in a portable receiver. However, pots and planters have grown in popularity even where land and gardening options are available. Pots and planters adorn porches and walkways across the world, often featuring flowers and are used both to grow food and for aesthetic purposes.

In general, pots and planter improves the overall physical beauty of the properties on which they are planter and may also contribute to the emotional well-being of those managing the plants received in the pots and planters.

There also exists a horticultural need to facilitate pollination between plants to improve the overall health of the plants being cross-pollinated. This pollination is difficult in environments where only a single species of plant exists in pots or planters at a single location, as is often the case where an individual is only interested in a single food source or species of flower (e.g., such as growing tomatoes). Overall health of all plants living around a particular property could be improved if planters were integrated with trees in a single growing process where trees and other plants were joined in close proximity in a symbiotic relationship. Trees themselves are being steadily weakened over time as trees are isolated in garden and lawn from other plant life traditionally surrounding them.

Because concerns with appearance have come to outweigh concerns with portability, it would be beneficial to provide a planter which was adapted to grow into its surroundings and be absorbed, physically and aesthetically, into a natural environment. It would be beneficial if such a plantar were easily affixed into a natural environment in a vertical orientation, such as to a tree.

Through the employment of the taught and recited planter herein, a planter is realized which overcomes these issues with the prior art and provides a planter which is detachably affixable into a surrounding environment in vertical orientation. There is a substantial need in the art from an improved planter taught herein.

SUMMARY

From the foregoing discussion, it should be apparent that a need exists for a frustoconical planter with vertical securement means. The present invention has been developed in response to the present state of the art, and in particular, in response to the problems and needs in horticulture involving aesthetics and natural integration.

Accordingly, the present invention has been developed to provide a frustoconical planter comprising: a frustocone tapering downwards having an open top end and an open bottom end, the frustocone defining a hollow interior recess adapted to receive a pot for securing a plant; wherein the pot defines a plurality of apertures for draining water from the open bottom end; a tripod affixed to the frustocone, the tripod comprising an elongated shaft affixed at a proximal end to the frustocone and two or more short legs; and attachment means affixed to a distal end of the elongated shaft adapted to affix the elongated shaft to an organic object.

The attachment means may comprise a clip. The open bottom end may be adapted to allow a tree branch to grow upwardly into the frustocone. An exterior surface of the frustocone is ornated to appear wooden.

The two or more short legs may converge at a medial point of the elongated shaft. The attachment means may comprise a clip having two interconnected prongs and a biased spring.

A second frustoconical planter is provided comprising: a frustocone tapering downwards having an open top end and an open bottom end, the frustocone defining a hollow interior recess adapted to receive soil and a plant; a tripod affixed to the frustocone, the tripod comprising an elongated shaft affixed at a proximal end to the frustocone and two or more short legs; and attachment means affixed to a distal end of the elongated shaft adapted to affix the elongated shaft to an organic object.

The attachment means may comprise a clip.

The open bottom end may be adapted to allow a tree branch to grow upwardly into the frustocone.

An exterior surface of the frustocone may be ornated to appear wooden.

The two or more short legs may converge at a medial point of the elongated shaft. The attachment means may comprise a clip having two interconnected prongs and a biased spring. The organic object may comprise a tree.

A third frustoconical planter is provided comprising: two or more frustocones tapering downwards having an open top end and an open bottom end, the frustocone defining a hollow interior recess adapted to receive a pot for securing a plant; wherein the pot defines a plurality of apertures for draining water from the open bottom end; a tripod affixed to a frustocone, the tripod comprising an elongated shaft affixed at a proximal end to the frustocone and two or more short legs; and attachment means affixed to a distal end of the elongated shaft adapted to affix the elongated shaft to an organic object.

The two or more short legs may converge at a medial point of the elongated shaft. The attachment means may comprise a clip having two interconnected prongs and a biased spring.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
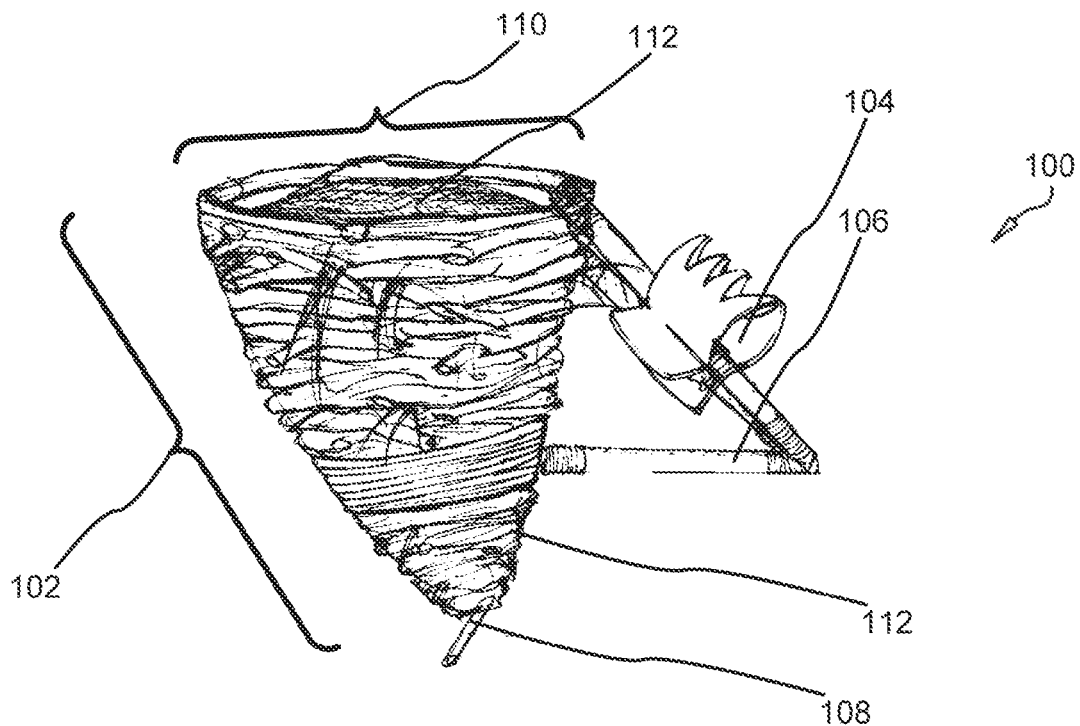
FIG. 1 is an upper, side perspective view of a frustoconical planter with vertical securement means in accordance with the present invention.
Figure 2:
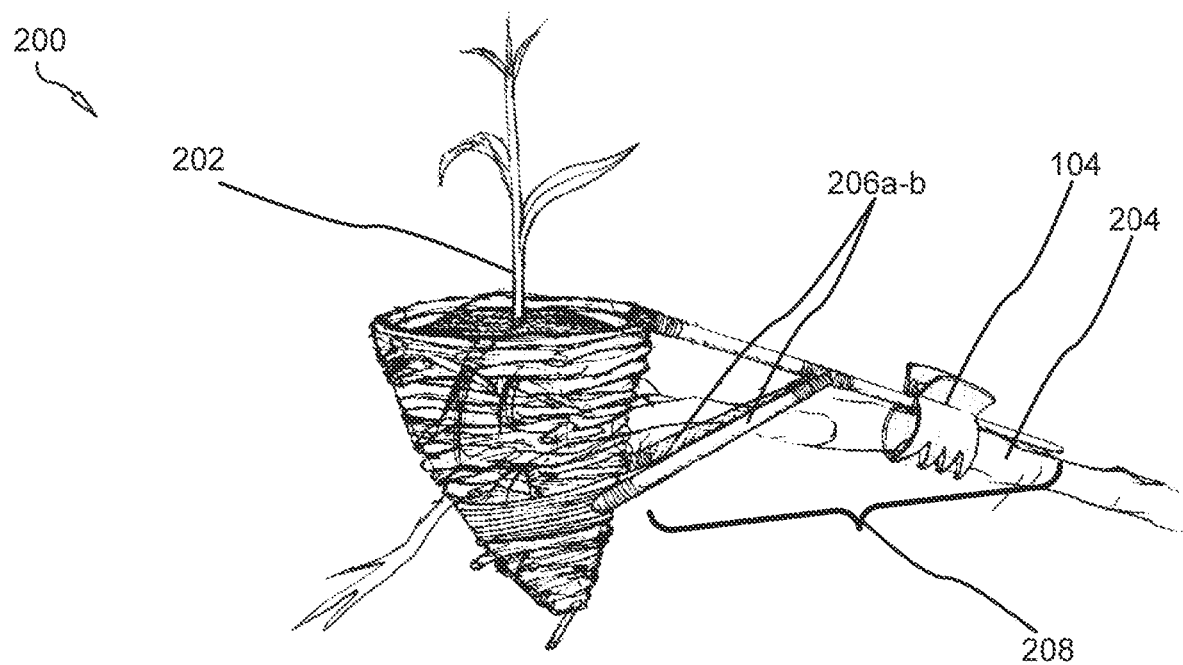
FIG. 2 is an environmental, upper, side perspective view of a frustoconical planter with vertical securement means in accordance with the present invention.

FIGS. 1-2 depict upper, side perspective view of a frustoconical planter with vertical securement means 100, 200 in accordance with the present invention.

The planter 100 comprises a frustocone 102 having an open top end 110 and an open bottom end 108. The frustocone 102 tapers from top to bottom, being more narrow in diameter at the bottom than at the top.

While the frustocone 102 may be symmetrically-shaped, in some embodiments as shown the frustocone 102 is warped, contorted, skewed, angled or eccentric such that the open bottom end 108 does not position concentrically with the open top end 110.

The planter 100 comprises a tripod 208 including two short legs 206a-b and an elongated leg 106 (or shaft). The elongated leg 106 extends distally from the frustocone 102 and the short legs 206a-b. The elongated leg 106 affixes at a proximal end to the frustocone 102 and has attachment means 104 for detachably affixing the elongated leg 106 to a tree, branch 204 or shrub. The attachment means 104 in the shown embodiment comprises a clothespin-like clip 104 having interlocking prongs biased by a spring to the closed position.

The short legs 206a-b converge and join at a medial point on the elongated shaft 106. A plant 202 is received, in some embodiments, into a hollow interior recess 112 defined by the frustocone 102.

The frustocone 102 contains a wood, or wood-like finish 112, adhered to its exterior which serves utilitarian and ornamental purposes. The wood-like finish 112 may be adapted to appear like a birds' nest, serving the utilitarian purpose of blending the frustocone 102 in with a surrounding natural environment in which animal and insects are more comfortable and where pollination activity is maximized.

Figure 3:
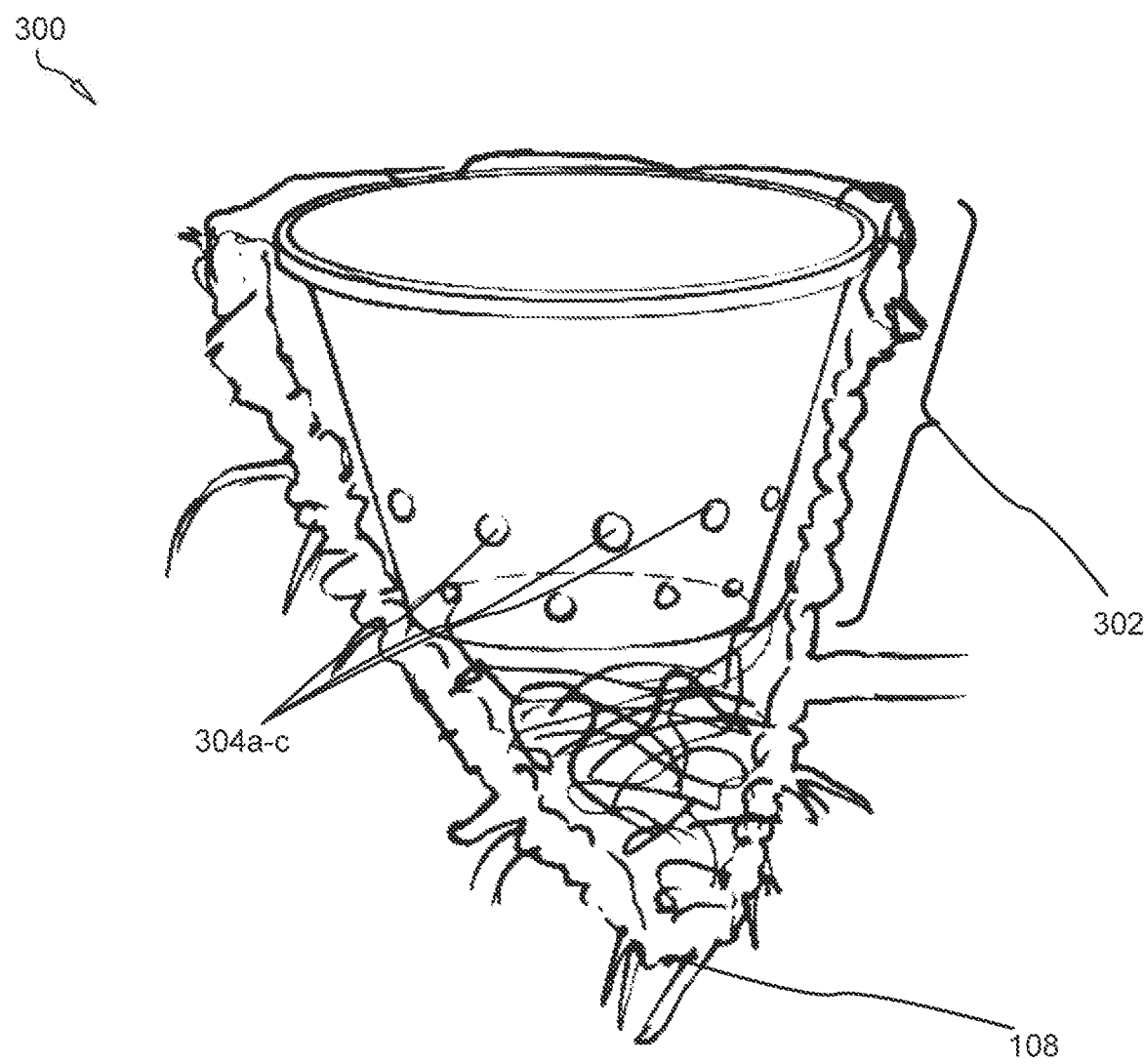
FIG. 3 is a sectioned upper, side perspective view of a frustoconical planter with vertical securement means in accordance with the present invention.
Figure 4:
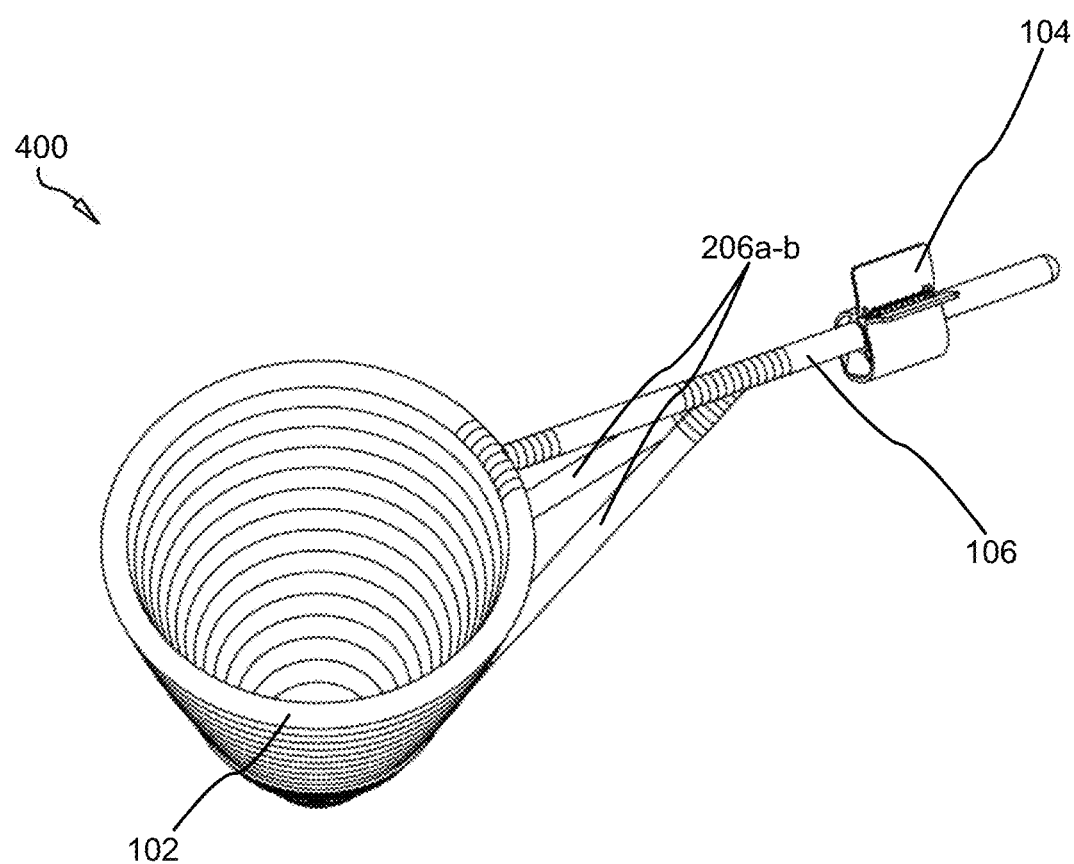
FIG. 4 is an upper isometric perspective view of a frustoconical planter with vertical securement means in accordance with the present invention.
Figure 5:
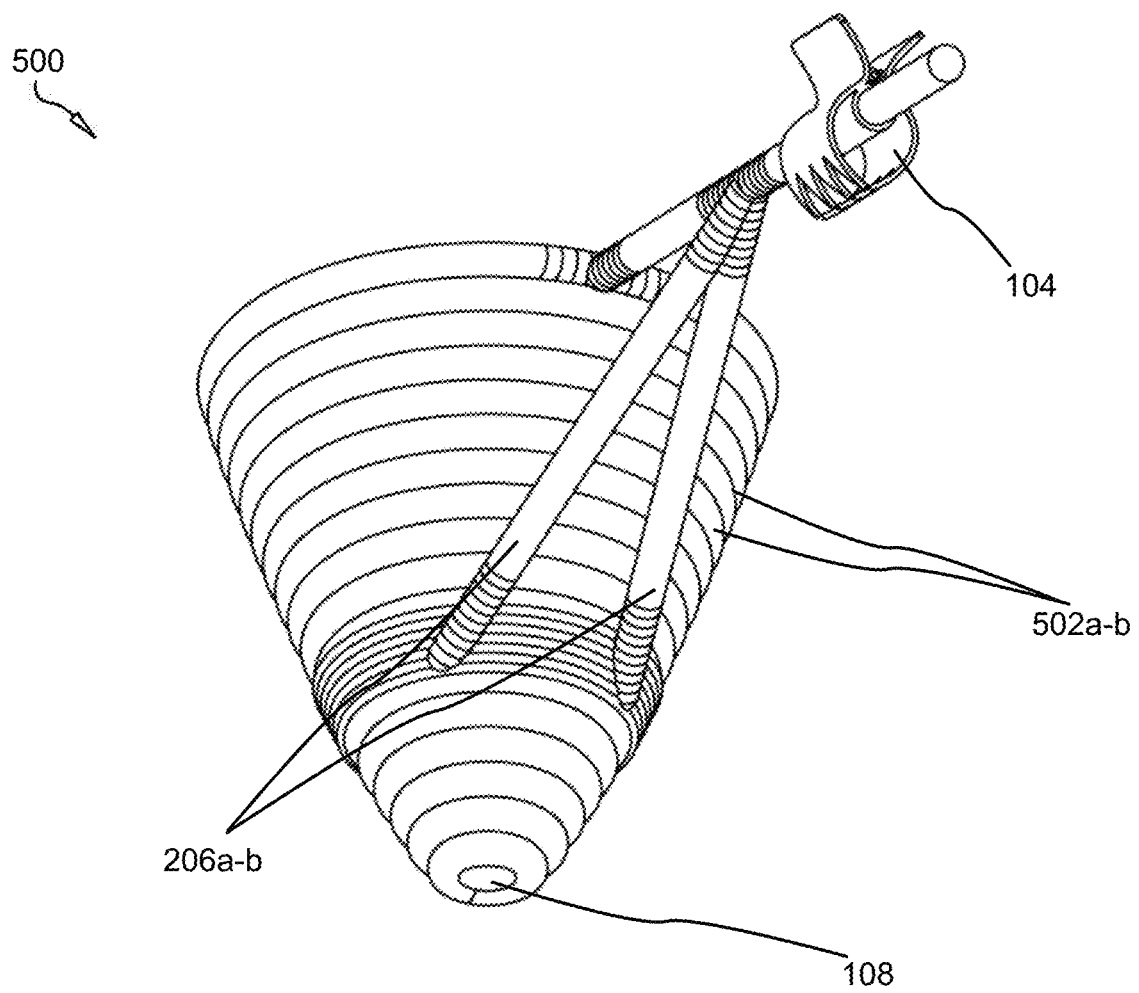
FIG. 5 is a lower isometric perspective view of a frustoconical planter with vertical securement means in accordance with the present invention.
Figure 6:
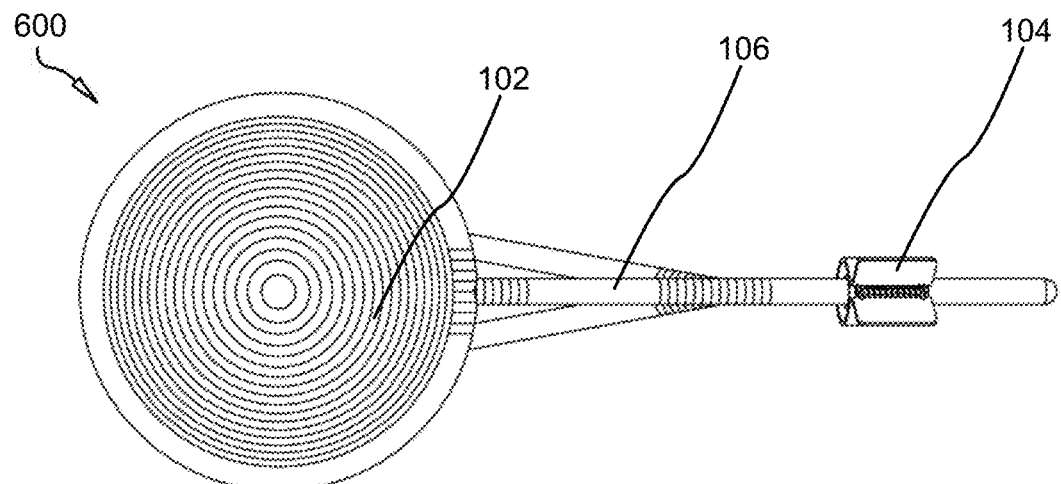
FIG. 6 is a top perspective view of a frustoconical planter with vertical securement means in accordance with the present invention.
Figure 7:
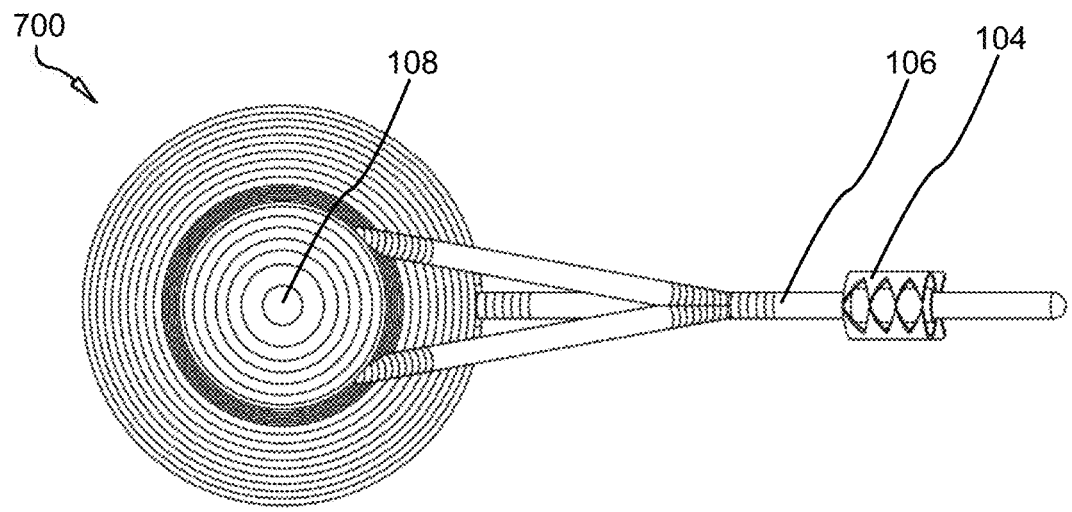
FIG. 7 is a lower perspective view of a frustoconical planter with vertical securement means in accordance with the present invention.
Figure 8:
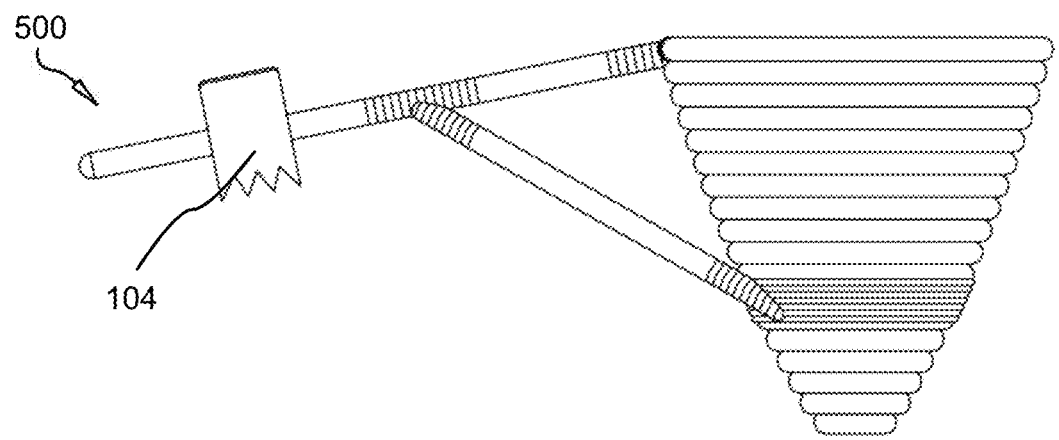
FIG. 8 is a side perspective view of a frustoconical planter with vertical securement means in accordance with the present invention.
Figure 9:
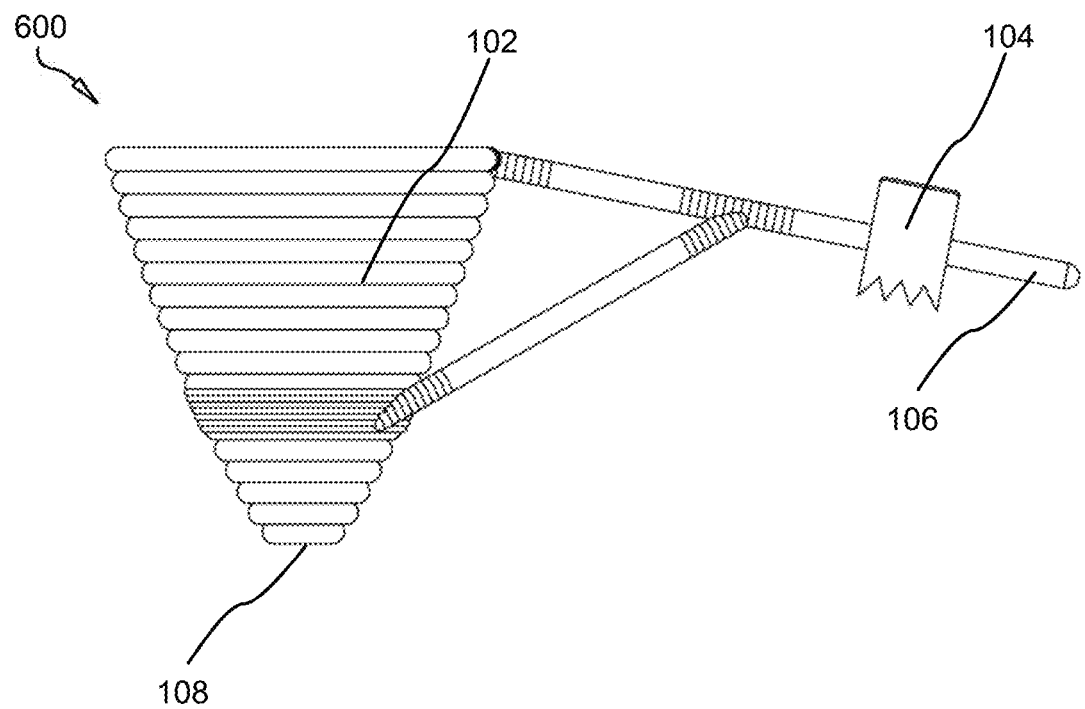
FIG. 9 is a side perspective view of a frustoconical planter with vertical securement means in accordance with the present invention.
Figure 10:
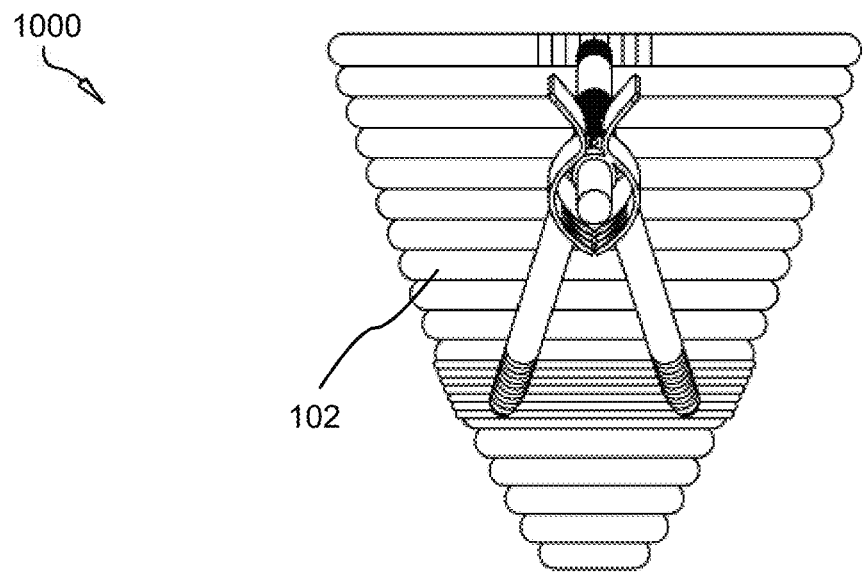
FIG. 10 is a rearward perspective view of a frustoconical planter with vertical securement means in accordance with the present invention.
Figure 11:
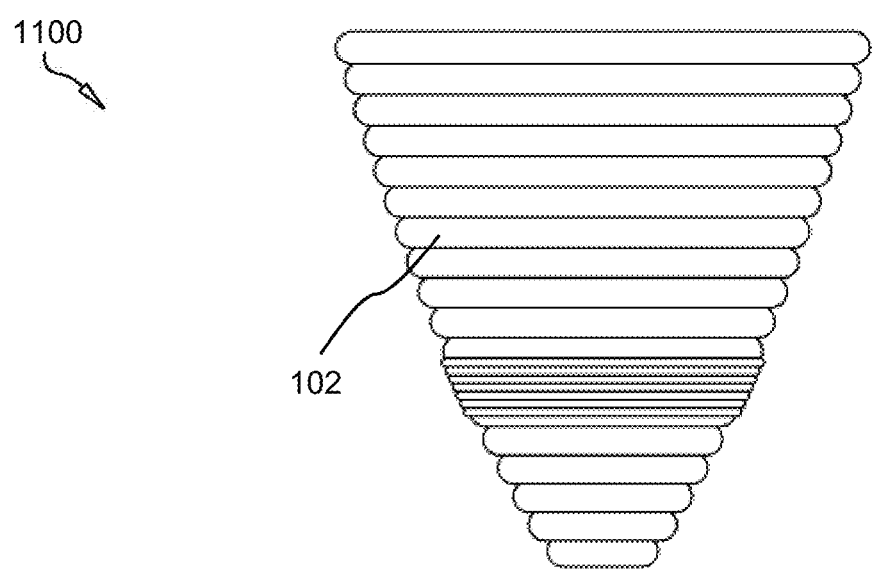
FIG. 11 is a forward perspective view of a frustoconical planter with vertical securement means in accordance with the present invention.

FIG. 3 is a sectioned upper, side perspective view of a frustoconical planter with vertical securement 300 means in accordance with the present invention.

The planter 300 comprises a pot 302 having a plurality of apertures 304a-c adapted to allow water to drain from the pot 302. The water draining from the pot 302 runs out of the open bottom end 108. The presence of water at the open bottom end attracts growth of plant life, including branches. The pot 302 rests in a substantially cylindrical recess with an open bottom end for allowing water to drain.

With time, branches and plant life adjoining the planter 300 grow into the open bottom end 108.

FIGS. 4-11 depict perspective views of a frustoconical planter with vertical securement means 400, 500, 600, 700, 800, 900, 1000, 1100 in accordance with the present invention.

The exterior surface of the frustocone 102 may be mottled, camouflaged, or simply ornated to blend in with the appearance of a tree using means known to those of skill in the art. In the shown embodiments, a plurality of artificial tree branches 502 circumscribe the frustocone 102. These artificial branches 502 may comprise rope, leather, paper mache, polymeric materials, wood, or other materials known to those of skill in the art. This exterior surfacing/ornation serves the utilitarian purpose of increasing emotional well-being of a user or caretaker by blending the apparatus 500 in with its natural surroundings. The exterior surfacing may be biodegradable.

In various embodiments, the frustocone 102 is affixed to the elongated shaft 106 without the short legs 206a-b. In these embodiments, the frustocone 102 may be suspended from the elongated shaft 104 using means known to those of skill in the art, including a ring or annular member recessed within the frustocone 102.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

What is claimed is:

1. A frustoconical planter comprising:
   a frustocone tapering downwards having an open top end and an open bottom end, the frustocone defining a hollow interior cylindrical recess adapted to receive a pot for securing a plant;
   wherein the pot defines a plurality of apertures for draining water from the open bottom end;
   an elongated shaft affixed at a proximal end to the frustocone and two or more legs; and
   attachment means affixed to a distal end of the elongated shaft adapted to affix the elongated shaft to an organic object.

2. The planter of claim 1, wherein open bottom end is adapted to allow a tree branch to grow upwardly into the frustocone.

3. The planter of claim 1, wherein an exterior surface of the frustocone is ornated to appear wooden.

4. The planter of claim 1, wherein the two or more short legs converge at a medial point of the elongated shaft.

5. A frustoconical planter comprising:
   a frustocone tapering downwards having an open top end and an open bottom end, the frustocone defining a hollow interior recess adapted to receive soil and a plant;
   an elongated shaft affixed at a proximal end to the frustocone and two or more legs; and
   attachment means affixed to a distal end of the elongated shaft adapted to affix the elongated shaft to an organic object.

6. The planter of claim 5, wherein the hollow interior recess is substantially cylindrical.

7. The planter of claim 5, wherein open bottom end is adapted to allow a tree branch to grow upwardly into the frustocone.

8. The planter of claim 5, wherein an exterior surface of the frustocone is ornated to appear one of wooden and nest-like.

9. The planter of claim 5, wherein the two or more short legs converge at a medial point of the elongated shaft.

10. The planter of claim 5, wherein the organic object comprises a tree.

11. A frustoconical planter comprising:
    two or more frustocones tapering downwards having an open top end and an open bottom end, the frustocone defining a hollow interior recess adapted to receive a pot for securing a plant;
    wherein the pot defines a plurality of apertures for draining water from the open bottom end;
    an elongated shaft affixed at a proximal end to the frustocone and two or more legs; and
    attachment means affixed to a distal end of the elongated shaft adapted to affix the elongated shaft to an organic object.

12. The planter of claim 11, wherein the two or more short legs converge at a medial point of the elongated shaft.

* * * * *